United States Patent
Rule et al.

(10) Patent No.: US 6,319,576 B1
(45) Date of Patent: Nov. 20, 2001

(54) METHOD TO INCREASE THE CRYSTALLIZATION RATE OF POLYESTERS

(75) Inventors: Mark Rule, Atlanta; Yu Shi, Conyers, both of GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 09/716,601

(22) Filed: Nov. 20, 2000

(51) Int. Cl.⁷ .............................. B29D 22/00; C08L 3/02
(52) U.S. Cl. .................... 428/35.7; 525/437; 525/444; 524/48; 524/129; 524/284; 428/36.9
(58) Field of Search .................... 525/437, 444; 524/48, 127, 284; 428/35.7, 36.9

(56) References Cited

U.S. PATENT DOCUMENTS

| | | | |
|---|---|---|---|
| 4,368,286 | 1/1983 | Hayashi et al. | 524/394 |
| 4,840,981 | 6/1989 | Hasuo et al. | 524/114 |
| 4,886,847 | 12/1989 | Bastioli et al. | 524/84 |
| 4,894,404 | 1/1990 | Minnick | 524/226 |
| 5,102,943 | 4/1992 | Logullo | 524/487 |
| 5,298,550 | 3/1994 | Riccardi et al. | 524/513 |
| 5,302,690 | 4/1994 | Kawaguchi et al. | 528/279 |
| 5,356,972 | 10/1994 | Sperling et al. | 524/313 |
| 5,389,710 | 2/1995 | Dege et al. | 524/243 |
| 5,405,921 | 4/1995 | Muschiatti et al. | 525/444 |

OTHER PUBLICATIONS

Mercier, J. P.; *Nucleation in Polymer Crystallization: A Physical or a Chemical Mechanism?*; Polymer Engineering and Science, Mid–Mar. 1990, vol. 30, No., pp. 270–277.

Mitra, Debaprasad et al.; *Study on the Effect of Dibenzylidene Sorbitol as a Nucleating Agent on the Crystallization and Morphology of Poly(ethylene Terephthalate)*; Journal of Applied Polymer Science, vol. 36, pp. 387–402, 1988.

Jang, Jyongsik et al.; *Crystallization Behavior of Poly(ethylene terephthalate) Blended with Hyperbranched Polymers: The Effect of Terminal Groups and Composition of Hyperbranched Polymers*; Macromolecules 2000, vol. 33, pp. 1864–1870.

Godovsky, Yu. K. et al.; *Kinetics of Polymer Crystallization from the Melt(Calorimetric Approach)*; Journal of Polymers Science: Polymer Physics Edition, vol. 12, pp. 1052–1088, 1974.

Gilmer, J. W. et al.; *The Use of Sodium Salts as Nucleation Agents for Polyethylene Terephthalate with Minimal Molecular Weight Reduction*; Polymer Engineering and Science, Mid–Sep. 1995, vol. 35, No. 17, pp. 1406–1413.

*Primary Examiner*—Samuel A. Acquah
(74) *Attorney, Agent, or Firm*—Sutherland, Asbill & Brennan, LLP

(57) ABSTRACT

A method for increasing the crystallization rate of a crystallization polyester comprises incorporating into the polyester an effective amount of a hyperfunctional nucleation agent. The hyperfunctional nucleating agent comprises a plurality of functional groups and form stable nuclei around which the polyester crystallizes. The hyperfunctional nucleating agent facilitates faster crystallization and formation of many small crystallites. Methods of making articles such as containers with polyesters are also disclosed.

40 Claims, No Drawings

METHOD TO INCREASE THE CRYSTALLIZATION RATE OF POLYESTERS

FIELD OF THE INVENTION

This is invention relates to a method for crystallizing polyester compositions. In particular, this invention relates to increasing the crystallization rate of poly(ethylene terephthalate) (PET) with hyperfunctional nucleation agents.

BACKGROUND OF THE INVENTION

Thermoplastic polyester materials have many commercial applications and are commonly used in fabrics, films, and containers. Polyesters are popular due the their mechanical strength, flexural characteristics, clarity, thermal stability, impact strength, and permeability characteristics. In the beverage industry, in particular, poly(ethylene terephthalate) (PET) has emerged as a major material for bottling carbonated as well as non-carbonated beverages.

In spite of these positive characteristics, PET possesses some significant limitations. One of these limitations is related to its rate of crystallization. The rate of crystallization of PET is slow relative to some other plastics, such as poly(butylene terephthalate) (PBT) and high density polyethylene (IIDPE). A consequence of this relatively slow rate of crystallization is that relatively long cycle times are required to achieve crystallinity in PET, and when achieved, crystallinity is often accompanied by opacity, due to the relatively large size of crystallites formed by thennal crystallization. Crystallinity itself is often desirable in molded parts, due to the higher thermal and mechanical stability associated with crystallinity. Crystallinity is especially desirable when parts or containers will be subjected to elevated temperatures.

Prior art methods to increase the rate of crystallization of PET have been directed toward incorporation of inorganic compounds, polyolefins, and salts into PET to act as nucleation aids. The use of these inorganic compounds and salts, while having a positive effect on the crystallization rate, have other adverse consequences. In particular, inorganic compounds and salts typically lower the thermal stability of PET. Salts such as sodium chlorobenzoate react with the polyester, and adversely affect the molecular weight. In addition, their effectiveness is time dependent; that is, the effectiveness of a given amount of sodium chlorobenzoate is dependent on the processing time in the polymer melt. Polyolefin nucleation agents, while increasing the rate of crystallization of PET, are relatively ineffective (requiring high loading levels), inherently affect clarity, and are thermally unstable at normal polyester processing conditions.

Thus, there exists a need in the art for a method to accelerate the rate of crystallization of PET that will allow crystalline PET parts to be manufactured without incurring long cycle times. In particular, there exists a need for a method to accelerate the rate of crystallization of PET that does not suffer the limitations of prior art methods.

SUMMARY OF THE INVENTION

Therefore, it is an object of the present invention to provide a method of crystallizing a polyester composition to produce a polyester article that is highly crystalline.

Another object of the present invention is to provide a method of crystallizing a polyester composition to produce a highly crystalline polyester article at high rates and without multiple processing steps.

Another object of the present invention is to provide a method of crystallizing a polyester composition that has improved clarity over prior art inventions.

Another object of the present invention is to provide a method of crystallizing a polyester composition that does not impair the thermal stability of the polyester.

This invention solves the above-described problems in the art by providing a method for increasing the crystallization rate of a crystallizable polyester comprising incorporating into the polyester an effective amount of a hyperfunctional nucleation agent. The hyperfunctional nucleation agent comprises a plurality of functional groups and is capable of forming covalent bonds with polyester chains. It is believed that, when the hyperfunctional nucleation agent is incorporated into the polyester, there is an increased tendency for the polymer chain to cluster, with a concomitant reduction in the entropy of the polyester in the vicinity of the hyperfunctional nucleation agent. Thus, the hyperfunctional nucleation agent is a stable nuclei in the polyester around which further crystallization occurs.

This invention also encompasses a method for crystallizing polyester comprising thermally forming a mixture including polyester and an effective amount of a hyperfunctional nucleation agent. Suitable methods of thermoforming include melt extrusion, injection molding and blow molding. Thus, this invention also encompasses articles made by thermally forming the mixture including polyester and the hyperfunctional nucleation agent. For example, the method of this invention is useful to make containers such as bottles.

These and other objects, features, and advantages of the invention will become apparent in the following detailed description and claims.

DETAILED DESCRIPTION OF THE INVENTION

In the crystallization of polymers, there are two separate events that occur. The first event is the formation of nuclei in the polymer matrix. The second event is growth of the crystallite around these nuclei. The overall rate of crystallization of the polymer is dependent, therefore, on the equilibrium concentration of nuclei in the polymer matrix, and on the rate of growth of crystallites around these nuclei.

Typically, at high temperatures, the rate of growth of crystallites is fast, while the steady state concentration of nuclei is relatively low. Conversely, at lower temperatures, the steady state concentration of nuclei is higher, but the rate of crystallite growth is slower. A consequence of this two-step process is that at high temperatures (relatively near the melting point) and at low temperatures (relatively near the glass transition temperature) the rate of crystallization is slow, while the rate is relatively faster at temperatures intermediate between these two transition temperatures. Another consequence is that at high temperatures there are relatively few, large crystallites formed, while at low temperatures, there are relatively more numerous, smaller crystallites formed.

In order to increase the rate of crystallization of a polymer, then, one must increase either the steady-state concentration of nuclei in the polymer matrix, or increase the rate of growth of crystallites. Increasing the rate of crystal growth a low temperature is difficult to achieve without changing the polymer composition itself, since the rate of crystal growth is inherently linked to the rate of motion of the polymer chains, which in turn is directly related to the glass transition temperature. Conversely, the steady-state concentration of the nuclei can, in principle, be readily adjusted, if stable surrogate nuclei can be incorporated into the polymer matrix. If this can be achieved, then the rate of crystallization will increase with increasing temperature, rather than going through a maximum rate at intermediate temperatures. This effect would be exhibited by a shift in the temperature of maximum crystallization rate toward higher temperatures.

While the number of crystallites formed is directly related to the number of nuclei present, the ultimate total crystallinity achieved at a given temperature will be approximately the same, regardless of the number of nuclei. Thus, if there are relatively few or relatively large nuclei, the resulting crystallites will be relatively large. Conversely, if there are a relatively large number of nuclei and each nucleus is relatively small, the resulting crystallites will also be relatively small. Large crystallites have a greater tendency to scatter incident light than small crystallites; therefore, when large crystallites are present, the polymer matrix will be more hazy or opaque than when small crystallites are present (at the same total level of crystallinity). Therefore, by use of effective nucleation agents that promote the formation of many small crystallites, the amount of haze in the crystallized polyester can be decreased in spite of crystallization at high temperatures. In addition, the size of the crystallites can be predetermined by controlling the amount of nucleation agent added.

Prior art methods of increasing the crystallization rate of polyesters have relied on the addition of inorganic compounds, salts, and polyolefin compounds to act as nucleation aids for crystallite growth. These prior art methods result in the presence of relatively few, large nuclei for crystallization, which in turn result in relatively modest improvements in crystallization rates, and in significant opacity of the crystallized polyester.

We have now discovered that the rate of crystallization of polyesters can be increased markedly when low levels of organic hyperfunctional compounds are incorporated into the polyester and are allowed to chemically react with the polymer. The hyperfunctional organic compound comprises a plurality of functional groups and is capable of forming covalent bonds with the polyester chains. Without being bound by theory, it is believed that, when such a hyperfunctional organic compound is incorporated into and reacts with the polyester, there is an increased tendency of the polymer chains to cluster, with a concomitant reduction in the entropy of the polyester in the vicinity of the hyperfunctional organic molecule. Thus, the hyperfunctional organic compound serves as a source of stable nuclei around which further crystallization can occur.

Because the hyperfunctional compounds are capable of being dispersed into the polyester matrix at a molecular level, each molecule of the hyperfunctional compound is capable of serving as a nucleation site. Therefore, low weight fractions of the hyperfunctional compound results in a large number of very small nuclei, facilitating formation of many small crystallites, rather than a few large crystallites. In addition, because there are many stable nuclei, the overall rate of crystallization can be faster than that obtained with some prior art nucleation agents.

The amount of hyperfunctional nucleation agent required to achieve increased crystallization rates is dependent on the inherent rate of crystal growth of the polyester employed, the type of hyperfunctional compound added, and the temperature of crystallization. Generally, the hyperfunctional nucleation agent is added to the polyester in an amount up to about 1% by weight of the polyester to achieve effective rates of crystallization. Desirably, the hyperfunctional nucleation agent is added to the polyester in an amount from about 0.005 to about 0.5% by weight of the polyester. More particularly, the hyperfunctional nucleation agent is added to the polyester in an amount from about 0.005 to about 0.1% by weight of the polyester.

The composition of the hyperfunctional nucleation agent can be varied over a wide range. Suitable hyperfunctional nucleation agents desirably possesses several features. First, suitable hyperfunctional nucleation agents include a plurality of functional groups capable of reacting with polyester chains. The number of functional groups per individual hyperfunctional nucleation agent molecule are preferably greater than 10, more preferably greater than 25, even more preferably greater than 50, and even more preferably greater than 100. Second, suitable hyperfunctional nucleation agents arc relatively stable to melt processing conditions for the polyester. Aside from the reaction of the functional groups with the polyester chains, desirably stable hyperfunctional nucleation agents are substantially inert during melt processing of polyester. Third, suitable hyperfunctional nucleation agents preferably have a relatively compact structure. Examples of hyperfunctional nucleation agents with relatively compact structures include dendrimers, hyperbranched polymers, and crosslinkable hyperfunctionalized polymers. Fourth, suitable hyperfunctional nucleation agents should possess a high density of functional groups. For example, reaction of polyester chains with the functional groups of a suitable hyperfunctional nucleation agent should result in a large number of polyester chains being forced into relatively close proximity to each other. Fifth, suitable hyperfunctional nucleation agents should be capable of dispersing into the polyester at a molecular level while retaining their hyperfunctional character.

Examples of hyperfunctional nucleation agents that meet the above criteria include starburst dendrimers with carboxylic acid functional groups, hyperbranched poly(phosphine oxides), poly(hydroxyethyl methacrylate), hydroxyethylated cyclodexttins, poly(acrylic acid), and the like. Examples of compounds that do not meet the above criteria include ethylene/acrylic acid copolymers, where the acrylic acid mole % is less than about 20%; cellulose; immiscible polymers such as oxidized polyolefins, and immiscible polyesters which can react to form copolymers. These last compounds, while effective as nucleation agents when partial transesterification has occurred, are not stable nucleation agents because transesterification typically proceeds over time to completion, resulting in a loss of nucleating ability.

Suitable polyesters for use in this invention include, but are not limited to, poly(ethylenc terephthalate) (PET), PET modified by incorporating diacids other than terephthalate acid (such as isophthalic acid) or glycols other than ethylene glycols (such as cyclohexane dimethanol (CHDM)), copolymers containing terephthalic acid, CHDM and other dibasic acids such as isophthalic acid, poly(ethylene naphthalate) (PEN), modified PEN, poly(ethylene isophthalate), modified poly(ethylene isophthalate), and mixtures thereof.

Since the activity of the hyperfunctional nucleation agents of the present invention are stable with time, it is possible to incorporate them into the subject polyesters by a variety of methods. Thus, they may be included in the polymer recipe during the manufacture of the polyester, during or after melt polymerization, or at the time the polyester is melt-processed to form the final parts or articles.

A variety of articles can be thermally formed using hyperfunctional nucleation agents in accordance with this invention. Except for this use of hyperfunctional nucleation agents, articles can be made in accordance with this invention by using conventional thermoforming methods such as melt processing. For example, the methods and compositions of this invention can be used to produce any type of polyester based container, particularly those used to transport or store beverages. Suitable containers include, but are not limited to, bottles, drums, carafes, coolers, and the like. Bottles can be made by conventional blow molding techniques such as the conventional two stage processing involving injection molding followed by blow molding. Bottle preforms are formed by injection molding the composition of this invention and then the solid preforms are formed in the bottles by blow molding techniques.

Because the hyperfunctional nucleation agents of the present invention increase the rate of crystallization of polyesters by providing stable nuclei for crystal growth, an appropriate measure of activity is the temperature of at which crystallization is occurring at a maximum rate ($T_c$ peak temperature), when measured by DSC (differential scanning calorimetry) and cooling at a defined rate from the polymer melt. The higher the $T_c$ peak temperature, the more effective the test nucleation agent is in nucleating crystallization of the polyester. Desirably stable hyperfunctional nucleation agents impart to polyester a $T_c$ peak temperature which varies little even when polyester mixed with the hyperfunctional nucleation agent is subjected to extended heat treatment. For example, a mixture of polyester and a suitable hyperfunctional nucleation agent, after being subjected to a heat treatment of 180° C. for 8 hours, has a $T_c$ peak temperature which is at least 98% of the $T_c$ peak temperature of the mixture without the heat treatment.

In the following examples which illustrate embodiments of this invention and comparative methods, selected hyperfunctional nucleation agents are evaluated by this test method for nucleation activity in PET and compared to controls such as PET without added nucleation agents and PET with a known highly active nucleation agent, sodium benzoate.

In each example, PET 8406 (from Shell Chemical) is compounded with the indicated amount of nucleation agent by physically blending the two materials in the amount specified, followed by melt extrusion at 275 deg C. The blended material was then evaluated by differential scanning calorimetry (DSC) at the indicated temperature. In each case, the sample was heated to 300 deg C and held for 10 minutes to ensure complete melting of the polyester; the sample was then cooled at either 25 deg C or 40 deg C per minute, and the temperature of the transitions recorded, as well as the total amount of heat flow for each transition.

COMPARATIVE EXAMPLE 1

PET 8406 was extruded without any additives. At a cooling rate of 25 deg C/min, the $T_c$ peak temperature was 154.4 deg C At a cooling rate of 40 deg C/min, the PET control had a $T_c$ peak temperature of 151 deg C.

COMPARATIVE EXAMPLE 2

PET 8406, melt extruded in the previous example, was heated in a vacuum oven overnight at 180 deg C. The material was then subjected to DSC analysis as before. At a cooling rate of 25 deg C/min, the $T_c$ peak temperature was 154.3 deg C. This example demonstrates that the peak temperature $T_c$ is not significantly affected by heat treatment, when nucleation agents are not added to the PET.

COMPARATIVE EXAMPLE 3

PET 8406 was compounded with 0.1% sodium benzoate by melt extrusion. The extruded material was subjected to DSC analysis. At a cooling rate of 25 deg C/min, the $T_c$ peak temperature was 188.7 deg C. At a cooling rate of 40 deg C/min, the $T_c$ peak temperature was 179.5 deg C.

COMPARATIVE EXAMPLE 4

The PET material from Example 3 was heated in a vacuum overnight at 180 deg C. The material was then subjected to DSC analysis as before. At a cooling rate of 25 deg C/min, the $T_c$ peak temperature was 182.4 deg C. This example shows the loss in nucleation ability of sodium benzoate with heat treatment.

COMPARATIVE EXAMPLE 5

PET 8406 was compounded with 2% PETI-40 by melt extrusion. The extruded material was subjected to DSC analysis. At a cooling rate of 25 deg C/min, the $T_c$ peak temperature was 190.9 deg C. At a cooling rate of 40 deg C/min, the $T_c$ peak temperature was 181.0 deg C.

COMPARATIVE EXAMPLE 6

The PET material from Example 5 was heated in a vacuum oven overnight at 180 deg C. The material was then subjected to DSC analysis as before, at a cooling rate of 25 deg C. The $T_c$ peak temperature was 156.1 deg C. This example shows the loss in nucleation ability of immiscible polyesters with heat treatment.

COMPARATIVE EXAMPLE 7

PET 8406 was compounded with 0.4% of an ethylene/acrylic acid copolymer, where the mole ratio of ethylene to acrylic acid was 4:1. The extruded material was subjected to DSC analysis. At a cooling rate of 25 deg C, the $T_c$ peak temperature was 156.1 deg C. This example shows that materials with a relatively low density of functional groups are not effective as nucleation agents for polyesters.

EXAMPLE 1

PET 8406 was compounded with 0.4% poly(hydroxyethyl methacrylate) by melt extrusion. The extruded material was subjected to DSC analysis. At a cooling rate of 40 deg C/min, the $T_c$ peak temperature was 182.2 deg C. At a cooling rate of 25 deg C/min, the material had a $T_c$ peak temperature of 189.2 deg C.

EXAMPLE 2

The PET material from Example 7 was heated in a vacuum oven overnight at 180 deg C. The material was then subjected to DSC analysis as before, at a cooling rate of 40 deg C.

The $T_c$ peak temperature was 181.9 deg C. This example shows both the activity and the stability of the claimed hyperfunctional nucleation agents for increasing the rate of crystallization of a polyester.

EXAMPLE 3

PET 8406 was compounded with 0.4% poly(acrylic acid) by melt extrusion. The extruded material was subject to DSC analysis. At a cooling rate of 40 deg C/min, the $T_c$ peak temperature was 178.6 deg C. At a cooling rate of 25 deg C/min, the TC peak temperature was 187.5 deg C.

EXAMPLE 4

The material from Example 3 was blended at a 1:10 ratio with virgin PET 8406 and was melt extruded to achieve further reaction between the relatively unreactive carboxylic acid groups and the polyester. The resulting material contained 0.04% poly(acrylic acid). DSC analysis at a cooling rate of 40 deg C showed the $T_c$ peak temperature to be 185.0 deg C. This example shows that hyperfunctional nucleation agents containing relatively unreactive carboxylic acid groups can also achieve high levels of nucleation activity, if sufficient reaction time is provided, and that high levels of nucleation can be achieved at very low levels of nucleation agents of the claimed invention.

EXAMPLE 5

PET 8406 was compounded with 0.4% of a carboxylic acid terminated starburst dendrimer (CAS registry no. [26937-01-9]). The extruded material was subjected to DSC analysis. At a cooling rate of 25 deg C/min, the $T_c$ peak temperature was 179.0 deg C.

EXAMPLE 6

The PET material from Example 5 was heated in a vacuum oven overnight at 180 deg C. The material was then subjected to DSC analysis as before, at a cooling rate of 25 deg C. The $T_c$ peak temperature was 176.0 deg C. This example shows both the activity and the stability of the claimed hyperfunctional nucleation agents for increasing the rate of crystallization of a polyester.

It should be understood that the foregoing relates to particular embodiments of the present invention, and that numerous changes may be made therein without departing from the scope of the invention as defined by the following claims.

What we claim:

1. A method for increasing the crystallization rate of a crystallizable polyester comprising incorporating into the polyester a hyperfunctional nucleation agent characterized by having a plurality of functional groups which react with polyester chains, the hyperfunctional nucleation agent present in an amount effective to increase the crystallization rate of the crystallizable polyester.

2. The method of claim 1, wherein the hyperfunctional nucleation agent is incorporated in an amount no greater than 1% by weight of the polyester.

3. The method of claim 1, wherein the hyperfunctional nucleation agent is incorporated in an amount no greater than 0.5% by weight of the polyester.

4. The method of claim 1, wherein the hyperfunctional nucleation agent is incorporated in an amount no greater than 0. 1% by weight of the polyester.

5. The method of claim 1, wherein the hyperfunctional nucleation agent is incorporated in an amount from about 0.005% to about 1% by weight of the polyester.

6. The method of claim 1, wherein the hyperfunctional nucleation agent is incorporated in an amount from about 0.005% to about 0.5% by weight of the polyester.

7. The method of claim 1, wherein the hyperfunctional nucleation agent is incorporated in an amount from about 0.005% to about 0.1% by weight of the polyester.

8. The method of claim 1, wherein the hyperfunctional nucleation agent comprises at least 10 reactive functional groups per molecule.

9. The method of claim 1, wherein the hyperfunctional nucleation agent comprises at least 50 reactive functional groups per molecule.

10. The method of claim 1, wherein the hyperfunctional nucleation agent comprises at least 100 reactive functional groups per molecule.

11. The method of claim 1, wherein the reactive functional groups are selected from the group consisting of amino, hydroxyl, and carboxyl functional groups.

12. The method of claim 1, wherein the hyperfunctional nucleation agent is incorporated into the polyester by contacting the hyperfunctional nucleation agent with the polyester in a molten state.

13. The method of claim 1, wherein the hyperfunctional nucleation agent is incorporated into the polyester when the polyester is at a temperature of at least 150° C.

14. The method of claim 1, wherein the hyperfunctional nucleation agent is characterized by being substantially inert during melt processing of polyester aside from the reaction of the functional groups with the polyester chains.

15. The method of claim 1, wherein the hyperfunctional nucleation agent is dispersible into the polyester at a molecular level.

16. The method of claim 1, wherein the hyperfunctional nucleation agent is selected from the group consisting of starburst dendrimers with carboxylic acid functional groups, hyperbranched poly(phosphine oxides), poly(hydroxyethyl methacrylate), hydroxyethylated cyclodextrins, and poly (acrylic acid).

17. The method of claim 1, wherein incorporating the hyperfunctional nucleation agent into the polyester forms a mixture having a $T_c$ peak temperature which, after the mixture subjected to a heat treatment of 180° C. for 8 hours, is at least 98% of the $T_c$ peak temperature of the mixture without the heat treatment.

18. The method of claim 1, wherein the polyester is poly(ethylene terephthalate).

19. A method for crystallizing polyester comprising thermoforming a mixture comprising polyester and a hyperfunctional nucleation agent characterized by having a plurality of functional groups which react with polyester chains, the hyperfunctional nucleation agent present in an amount effective to increase the crystallization rate of the crystallizable polyester.

20. An article made according to the method of claim 19.

21. An article as in claim 20 wherein the article is a container.

22. An article as in claim 20 wherein the article is a bottle.

23. A thermally formable composition comprising polyester and a hyperfunctional nucleation agent characterized by having a plurality of functional groups which react with polyester chains, the hyperfunctional nucleation agent present in an amount effective to increase the crystallization rate of the crystallizable polyester.

24. The composition of claim 23, wherein the hyperfunctional nucleation agent is incorporated in an amount no greater than 1% by weight of the polyester.

25. The composition of claim 23, wherein the hyperfunctional nucleation agent is incorporated in an amount no greater than 0.5% by weight of the polyester.

26. The composition of claim 23, wherein the hyperfunctional nucleation agent is incorporated in an amount no greater than 0.1% by weight of the polyester.

27. The composition of claim 23, wherein the hyperfunctional nucleation agent is incorporated in an amount from about 0.005% to about 1% by weight of the polyester.

28. The composition of claim 23, wherein the hyperfunctional nucleation agent is incorporated in an amount from about 0.005% to about 0.5% by weight of the polyester.

29. The composition of claim 23, wherein the hyperfunctional nucleation agent is incorporated in an amount from about 0.005% to about 0.1% by weight of the polyester.

30. The composition of claim 23, wherein the hyperfunctional nucleation agent comprises at least 10 reactive functional groups per molecule.

31. The composition of claim 23, wherein the hyperfunctional nucleation agent comprises at least 50 reactive functional groups per molecule.

32. The composition of claim 23, wherein the hyperfunctional nucleation agent comprises at least 100 reactive functional groups per molecule.

33. The composition of claim 23, wherein the reactive functional groups are selected from the group consisting of amino, hydroxyl, and carboxyl functional groups.

34. The composition of claim 23, wherein the hyperfunctional nucleation agent is incorporated into the polyester by contacting the hyperfunctional nucleation agent with the polyester in a molten state.

35. The composition of claim 23, wherein the hyperfunctional nucleation agent is incorporated into the polyester when the polyester is at a temperature of at least 150° C.

36. The composition of claim 23, wherein the hyperfunctional nucleation agent is characterized by being substantially inert during melt processing of polyester aside from the reaction of the functional groups with the polyester chains.

37. The composition of claim 23, wherein the hyperfunctional nucleation agent is dispersible into the polyester at a molecular level.

38. The composition of claim 23, wherein the hyperfunctional nucleation agent is selected from the group consisting of starburst dendrimers with carboxylic acid functional groups, hyperbranched poly(phosphine oxides), poly(hydroxyethyl methacrylate), hydroxyethylated cyclodextrins, and poly(acrylic acid).

39. The composition of claim 23, wherein incorporating the hyperfunctional nucleation agent into the polyester forms a mixture having a $T_c$ peak temperature which, after the mixture subjected to a heat treatment of 180° C. for 8 hours, is at least 98% of the $T_c$ peak temperature of the mixture without the heat treatment.

40. The composition of claim 23, wherein the polyester is poly(ethylene terephthalate).

* * * * *